Dec. 11, 1962  N. R. HESHER ETAL  3,067,711
CATAMARAN BOAT HULL CONSTRUCTION
Filed June 22, 1960  2 Sheets-Sheet 2
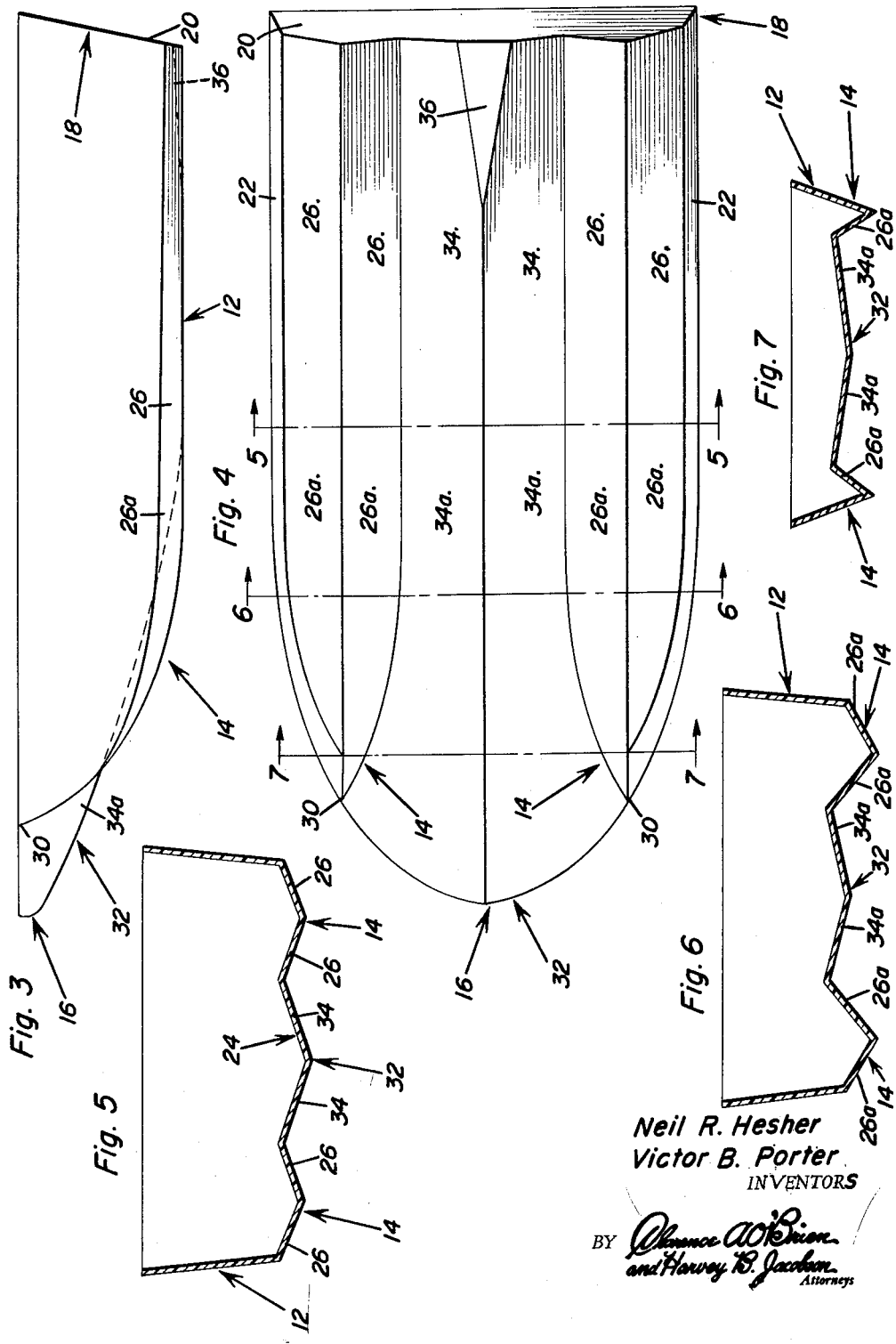
Neil R. Hesher
Victor B. Porter
INVENTORS
BY
Attorneys United States Patent Office 3,067,711
Patented Dec. 11, 1962

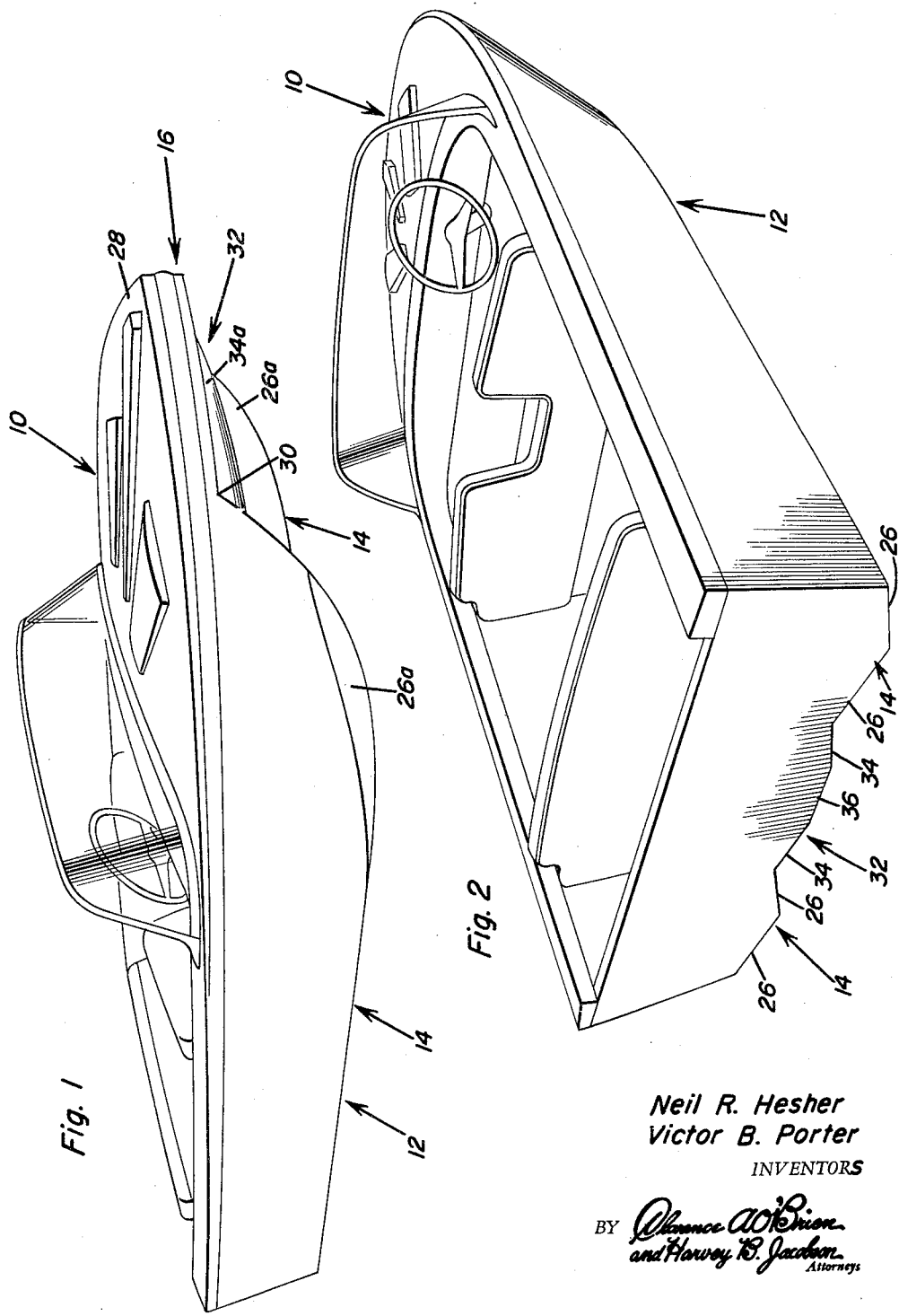

3,067,711
CATAMARAN BOAT HULL CONSTRUCTION
Neil R. Hesher and Victor B. Porter, Decatur, Ind., assignors to Duo Marine, Inc., Decatur, Ind., a corporation of Indiana
Filed June 22, 1960, Ser. No. 37,929
3 Claims. (Cl. 114—66.5)

This invention relates to a novel and useful catamaran boat hull construction specifically adapted for use with a single outboard motor secured to the transom in a substantially centrally disposed position.

The catamaran type of boat hull construction has many advantages over the conventional types of hull construction such as flat-bottomed or V-bottomed boat hulls. Some of the advantages of the catamaran type of boat hull construction include both increased safety and a smoother ride. Additionally, the catamaran of boat hull construction is quite well adapted for high speed running in choppy waters.

Although the catamaran type of hull includes these advantages, its use as a small pleasure craft powered by outboard motors includes one disadvantage which has heretofore greatly reduced the number of boat constructions of the catamaran type being used as pleasure crafts.

The usual catamaran hull construction includes the provision of a pair of depending and longitudinally extending transversely spaced sponsons defining a relatively wide tunnel therebetween. With this type of construction, a single outboard motor cannot be conveniently used inasmuch as a hull equipped with a single outboard motor will not operate and handle efficiently unless the single outboard motor is centered with respect to the transom of the boat. With the usual catamaran type of hull construction, the outboard motor cannot be centered with respect to the transom inasmuch as the tunnel formed between the depending sponsons is aligned with the center of the transom. If an outboard motor were secured in alignment with the tunnel between the depending sponsons of a catamaran type of hull, the lower unit of the outboard motor would constantly be running in foamy water and would occasionally be completely lifted clear of the water. When a catamaran type of hull is under way at high speeds, the two depending sponsons create substantial spray within the tunnel therebetween and the forward ends of the sponsons break up waves creating considerable turbulence between the sponsons. If the lower unit of an outboard motor were forced to operate in foamy and turbulent water such as that between the depending sponsons of a catamaran, excessive cavitation of the propeller of the outboard motor would result causing lack of power and speed as well as undue wear on the outboard motor itself due to its running beyond normal operating speeds.

It is therefore the main object of this invention to provide a catamaran type of hull construction which will retain substantially all of the advantages of the conventional form of catamaran hull construction but which will also enable the use of a single outboard motor.

A further object of this invention, in accordance with the immediately preceding object, is to provide a catamaran hull with at least one additional depending sponson disposed between the two outer sponsons of the hull with the forward end of the center sponson inclining forwardly and upwardly toward the bow of the hull.

A still further object of this invention, in accordance with the preceding objects, is to provide the forward ends of the outer sponsons with forwardly and upwardly curving end portions and the forward end of the center sponson with a substantially straight and upwardly inclined forward end portion thereby defining a wedge between the forward ends of the outer sponsons.

Another object of this invention is to provide each of the sponsons with a pair of downwardly convergent lower surfaces.

A still further object of this invention is to provide the aft portion of the center sponson with a rearwardly and upwardly inclined flat portion in alignment with the center of the transom of the hull in order to further decrease the possibility of an outboard motor secured and centrally disposed relative to the transom operating under cavitation conditions.

Yet another object of this invention is to provide a catamaran type of hull construction that will bank while executing a sharp turn at high speeds and greatly minimize side slipping while executing a sharp turn at high speeds.

Still another object of this invention is to provide a wedging member between the depending sponson of the catamaran hull which will entrap greater quantities of air between the outermost depending sponsons of the hull while traveling at high speeds to effect a lift and thereby decrease the wetted area of the hull and increase the speed of the latter.

A further object of this invention is to provide a catamaran type of hull construction which may be steered substantially as easily as the conventional flat or V-bottomed hulls.

A final object to be specifically enumerated herein is to provide a catamaran boat hull construction which will conform to conventional forms of manufacture and be of simple construction so as to provide a device that will be economically feasible and long lasting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the catamaran boat hull construction comprising the present invention illustrating the manner in which the forward ends of the outer sponsons depend below and embrace the V-shaped wedge;

FIGURE 2 is a perspective view of the catamaran boat hull construction similar to that of FIGURE 1 but showing the rear portion of the boat hull and the manner in which the rear end of the wedge is provided with a rearwardly and upwardly inclined flat portion;

FIGURE 3 is a schematic side elevation view of the boat hull construction;

FIGURE 4 is a bottom plan view of the boat hull construction seen in FIGURE 3;

FIGURE 5 is a vertical transverse sectional view taken subsbtantially upon the plane indicated by the section line 5—5 of FIGURE 4;

FIGURE 6 is a transverse vertical sectional view taken substantially upon the plane indicated by the section line 6—6 of FIGURE 4; and FIGURE 7 is a transverse vertical sectional view taken substantially upon the plane indicated by the section line 7—7 of FIGURE 4.

Referring now more specifically to the drawings, the numeral 10 generally designates a boat of the run-about type utilizing the catamaran boat hull construction comprising the boat hull construction which is generally referred to by the reference numeral 12.

The boat hull construction 12 includes a pair of spaced longitudinally extending and parallel sponsons each generally designated by the reference numeral 14.

Although it is to be understood that the hull construction 12 may be of any conventional construction such as wood, aluminum or fiberglass and the like, the hull construction 12 illustrated in the drawings is shown constructed of fiberglass and with only the outer panels of the hull being shown with bracing and stiffening members being omitted in the interest of simplicity.

The boat hull construction 12 includes a bow generally indicated by the reference numeral 16 and a stern generally indicated by the reference numeral 18 including a transom 20.

The hull construction 12 includes a pair of opposite sides 22 and a bottom generally designated by the reference numeral 24.

The sponsons 14 are formed along the opposite longitudinal sides of the bottom 24 and are substantially parallel to each other and each include a pair of downwardly convergent lower surfaces 26. The downwardly convergent surfaces 26 extend forwardly from the transom 20 to approximately the section line 5—5 of FIGURE 4 wherein the surfaces 26 merge into the upwardly curving convergent surfaces 26a of the forward ends of the sponsons 14. The surfaces 26 are substantially straight and the sponsons 14 are substantially constant and equal in cross-sectional area and shape from the transom 20 to the surfaces 26a. Of course, it is to be noted that the surfaces 26a are formed as continuations of the surfaces 26.

The surfaces 26a curve upwardly continuously until the sponsons 14 intersect with the deck 28 of the boat 10 as indicated at 30, see FIGURES 1, 3 and 4.

The structure hereinbefore set forth is conventional or may be considered so in substantially every type of catamaran hull construction. Normally, the tunnel defined between the sponsons 14 would be appreciable in vertical height and the center portion of the bottom defining the upper portion of the tunnel would extend substantially parallel to the deck 28.

In the hull construction 12, however, a center sponson or V-shaped wedge generally referred to by the reference numeral 32 is provided which extends between the sponsons 14 and longitudinally of the hull construction 12. The rear portion of the center wedge is substantially V-shaped as are the sponsons 14 and includes a pair of depending convergent surfaces 34. The surfaces 34 are substantially straight and extend forwardly from the transom 20 to the section line 5—5 of FIGURE 4 wherein they then merge into the forwardly and upwardly inclined depending convergent surfaces 34a. The forward portion of the center wedge 32 defined by the surfaces 34a extends forwardly from the section line 5—5 FIGURE 4 to the bow 16.

The rear end of the rear portion of the V-shaped wedge 32 is provided with a rearwardly and upwardly inclined flat portion 36.

With attention now directed more particularly to FIGURES 5 through 7 of the drawings it will be noted that the occluded angle formed by the downwardly convergent surfaces 26a of the forward ends of the sponsons 14 gradually decreases toward the front of the bow from the section line 5—5 of FIGURE 4. Further, it will be noted that the angle formed by the depending convergent surfaces 34a gradually increases from the section line 5—5 of FIGURE 4 to the bow 16.

With attention now directed specifically to FIGURE 3 of the drawings it will be noted that the forward portion of the V-shaped wedge 32 lies substantially upon a chord of the arcs scribed by the upwardly curving forward portions of the sponsons 14.

With the exception of the flat portion 36, the V-shaped wedge 32 is substantially the same in cross-sectional outline rearwardly of the section line 5—5 of FIGURE 4 as the sponsons 14.

In operation, the hull construction 12, while having the stability and ease of riding qualities of a conventional type of catamaran hull construction, because of the sponsons 14, the hull construction 12 also acts while executing a turn at high speeds similar to a conventional flat or V-shaped bottom hull and will not tend to slide on an even keel through a fast turn as will the conventional types of catamaran hulls. The center wedge portion 32 acts as a partial floor for the tunnel formed by the sponsons 14 and therefore it could be considered that the rear portion of the hull construction 12 is similar to a conventional flat-bottomed boat but that it is provided with depending longitudinally extending runners through its width. In this manner, the hull construction 12 will bank on turns as will the flat-bottomed hulls. The depending surfaces of the sponsons 14 and the wedge 32 tend to break up choppy water and render a much smoother ride. Additionally, while the portions of the sponsons 14 extending below the inclined forward end of the V-shaped wedge 32 assist insuring that the boat will normally run in a straight and true course, the provision of the portion of the center wedge rearwardly of the section line 5—5 of FIGURE 4 greatly minimizes the channel-like structure normally encountered with a catamaran boat hull and therefore a boat hull construction 12 is substantially easier to maneuver in turns. A normal or conventional type of catamaran hull construction requires a greater lateral force to execute a turn than does the hull construction 12. The inclined forward portion of the center wedge 32 tends to break up waves entering between the sponsons 14 but the curved portions of the sponsons 14 depending below the wedge 32 offer to cushion the movement of the bow portion of the hull construction 12 through choppy water. As the inner surfaces of the sponsons 14 deflect spray inwardly, the V-shaped wedge 32 tends to knife through the choppy water between the sponsons 14 and direct the air bubbles therein to the two tunnels formed between the center wedge 32 and the sponsons 14. Accordingly, the water beneath the center of the rear portion of the wedge 32 is substantially free of turbulent and foamy water thereby enabling the lower unit of an outboard motor secured to the transom 20 to be positioned immediately behind the center wedge 32 without cavitation occurring due to the propeller of the outboard motor spinning rapidly in foaming water. The flat portion 36 provides a means whereby the water forwardly of the lower unit of an outboard motor secured to the hull construction 12 may operate and pass through a portion of water whose upper surface is smooth and substantially flat thereby further eliminating the possibility of cavitation due to a V-shaped trough being formed in the water forwardly of the lower unit of the outboard motor.

The sponsons 14 and the rear portion of the V-shaped wedge 34 form a plurality of depending keels and these keels, when the boat construction 12 is under way at slow speeds, greatly reduce the tendency of the hull construction 12 to yaw while traveling through choppy water.

Although the flat portion 36 has been illustrated at the rear end of the V-shaped wedge 32, it is to be noted that if it is desired a similar flat portion could also be provided at the rear ends of the sponsons 14 whereby the boat hull construction 12 would also be well adapted for use with dual outboard motors.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A catamaran boat hull construction comprising a single and unitary hull including a center and a pair of opposite side immediately adjacent longitudinally extending, parallel and depending V-shaped sponsons each including a pair of downwardly convergent surfaces, said sponsons each being substantially straight and constant in cross-sectional area and shape from the stern of said hull to a point forwardly of the mid-point thereof, the forward end portions of the opposite side sponsons disposed forwardly of said point curving upwardly and decreasing in maximum width gradually toward the bow end of said hull, the forward end portion of said center sponson being upwardly inclined forwardly of said point and increased in width toward said bow, the included angle formed by the downwardly convergent surfaces of said center and opposite side sponsons gradually increasing and decreasing respectively from said point toward said bow end of said hull, said center sponson including a rearwardly and upwardly extending flat portion formed on its rear end from a point spaced forwardly of the stern and the hull to the rear end of said center sponson, said flat portion intersecting with the apex of said inclined surfaces of said center sponson at its forward end.

2. The combination of claim 1 wherein the lower apex edge of the forward portion of said center sponson extends substantially in a plane passing through chords of the lower apex edges of the forward end portions of said opposite side sponsons.

3. The combination of claim 2 wherein said center sponson projects forwardly of the forward extremities of said opposite side sponsons.

References Cited in the file of this patent

UNITED STATES PATENTS

| | | |
|---|---|---|
| 450,350 | Bruce | Apr. 14, 1891 |
| 1,312,036 | Lebby | Aug. 5, 1919 |
| 1,658,080 | Ferron | Feb. 7, 1928 |
| 1,712,758 | Durand | May 14, 1929 |
| 2,020,792 | Maynard et al. | Nov. 12, 1935 |
| 2,249,958 | Inwood | July 22, 1941 |
| 2,422,818 | Bamberger | June 24, 1947 |
| 2,483,663 | Nowak | Jan. 12, 1946 |
| 2,989,939 | Tatter | June 27, 1961 |
| 2,995,104 | Mills | Aug. 8, 1961 |

FOREIGN PATENTS

| | | |
|---|---|---|
| 297,802 | Great Britain | Mar. 14, 1929 |